United States Patent
LeBlanc

(10) Patent No.: US 12,517,673 B1
(45) Date of Patent: Jan. 6, 2026

(54) TECHNIQUES FOR STORING VEHICLE DATA

(71) Applicant: Zoox, Inc., Foster City, CA (US)

(72) Inventor: Robert-Lee Daniel LeBlanc, Spanish Fork, UT (US)

(73) Assignee: Zoox, Inc., Foster City, CA (US)

( * ) Notice: Subject to any disclaimer, the term of this patent is extended or adjusted under 35 U.S.C. 154(b) by 873 days.

(21) Appl. No.: 17/732,886

(22) Filed: Apr. 29, 2022

(51) Int. Cl.
*G06F 3/06* (2006.01)
*G06F 13/16* (2006.01)

(52) U.S. Cl.
CPC .......... *G06F 3/0655* (2013.01); *G06F 3/0604* (2013.01); *G06F 3/067* (2013.01); *G06F 13/1615* (2013.01); *G06F 13/1636* (2013.01); *G06F 13/1694* (2013.01)

(58) Field of Classification Search
CPC ...... G06F 3/0655; G06F 3/0604; G06F 3/067; G06F 13/161; G06F 13/1615; G06F 13/1621; G06F 13/1636; G06F 13/1694; G01C 21/3833
USPC ......... 701/29.1; 711/147–148, 154, 170, 173
See application file for complete search history.

(56) References Cited

U.S. PATENT DOCUMENTS

| | | | | |
|---|---|---|---|---|
| 11,561,902 | B2* | 1/2023 | Stonelake | G06F 12/0897 |
| 12,164,306 | B1* | 12/2024 | Filarsky | G05D 1/0219 |
| 2013/0321472 | A1* | 12/2013 | Piemonte | G06F 1/1626 |
| | | | | 345/672 |
| 2019/0222325 | A1* | 7/2019 | Klassen | G06F 8/61 |
| 2020/0003897 | A1* | 1/2020 | Shroff | G01S 17/931 |
| 2020/0348874 | A1* | 11/2020 | Iyer | G06F 13/1668 |
| 2021/0103404 | A1* | 4/2021 | Hosseinimakarem | G06F 3/0688 |

FOREIGN PATENT DOCUMENTS

| | | | | |
|---|---|---|---|---|
| CN | 101681305 | A * | 3/2010 | G11B 20/18 |
| CN | 101918924 | A * | 12/2010 | H04N 21/8545 |
| CN | 102667738 | A * | 9/2012 | G06F 11/1092 |
| CN | 110187827 | B * | 10/2021 | G06F 21/602 |

(Continued)

OTHER PUBLICATIONS

Cheng, Xiang, et al. "Mobile big data: The fuel for data-driven wireless." IEEE Internet of things Journal 4.5 (2017): 1489-1516. (Year: 2017).*

Xu, Wenchao, et al. "Internet of vehicles in big data era." IEEE/CAA Journal of Automatica Sinica 5.1 (2017): 19-35. (Year: 2017).*

(Continued)

*Primary Examiner* — Cuong H Nguyen
(74) *Attorney, Agent, or Firm* — Lee & Hayes, P.C.

(57) ABSTRACT

This disclosure is directed to techniques for storing vehicle data. For instance, system(s) may receive first vehicle data generated by first vehicles operating in a first geographic area. The system(s) may then store the first vehicle data in a first memory. Additionally, the system(s) may determine a type of vehicle data to request from other system(s). The system(s) may then send the other system(s) a request for the type of vehicle data. Based on sending the request, the systems may receive second vehicle data that includes the type of vehicle data, where the second vehicle data is generated by second vehicles operating in a second geographic area. The system(s) may then store the second vehicle data in a second memory. The first memory may be a first type of memory and the second memory may be a second type of memory that is different than the first type of memory.

20 Claims, 6 Drawing Sheets

(56) References Cited

FOREIGN PATENT DOCUMENTS

| | | | | |
|---|---|---|---|---|
| DE | 102021200848 A1 | * | 8/2022 | |
| JP | 2004320435 A | * | 11/2004 | ............... H04H 1/00 |
| JP | 2022023800 A | * | 2/2022 | ............ B60R 16/023 |
| WO | WO-2021072003 A1 | * | 4/2021 | ......... G06F 12/0284 |

OTHER PUBLICATIONS

Arthurs, Peter, et al. "A taxonomy and survey of edge cloud computing for intelligent transportation systems and connected vehicles." IEEE Transactions on Intelligent Transportation Systems 23.7 (2021): 6206-6221. (Year: 2021).*

Liu, Shaoshan, et al. "Liu, Shaoshan, et al. Edge computing for autonomous driving: Opportunities and challenges." Proceedings of the IEEE 107.8 (2019).*

An English-translated version from Stephan Preus et al JP 2022023800 A Feb. 8, 2022). (Year: 2022).*

Hu, Xiaoya, et al. "A data sharing scheme based on federated learning in IoV." IEEE Transactions on Vehicular Technology 72.9 (2023): 11644-11656. (Year: 2023).*

Dai, Yueyue, et al. "Reconfigurable intelligent surface for low-latency edge computing in 6G." IEEE Wireless Communications 28.6 (2022): 72-79. (Year: 2022).*

Farooqi, Abdul Majid, et al. "A fog computing model for VANET to reduce latency and delay using 5G network in smart city transportation." Applied Sciences 12.4 (2022): 2083. (Year: 2022).*

Rao, D. Nageswara, et al. "An innovative methodology for network latency detection based on IoT centered blockchain transactions." Wireless Communications and Mobile Computing 2022.1 (2022): 8664079. (Year: 2022).*

* cited by examiner

TECHNIQUES FOR STORING VEHICLE DATA

BACKGROUND

Vehicles generate large amounts of data when navigating around environments. For instance, the vehicles may generate sensor data using sensors, generate data using systems that analyze the sensor data, generate data for controlling the vehicles, and/or the like. In some circumstances, it is important to store this data, such as to later retrieve and analyze the data in order to further train the systems of the vehicles. However, based on the amount of data, it may be difficult to store the data in such a way that users are able to easily and efficiently retrieve the data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
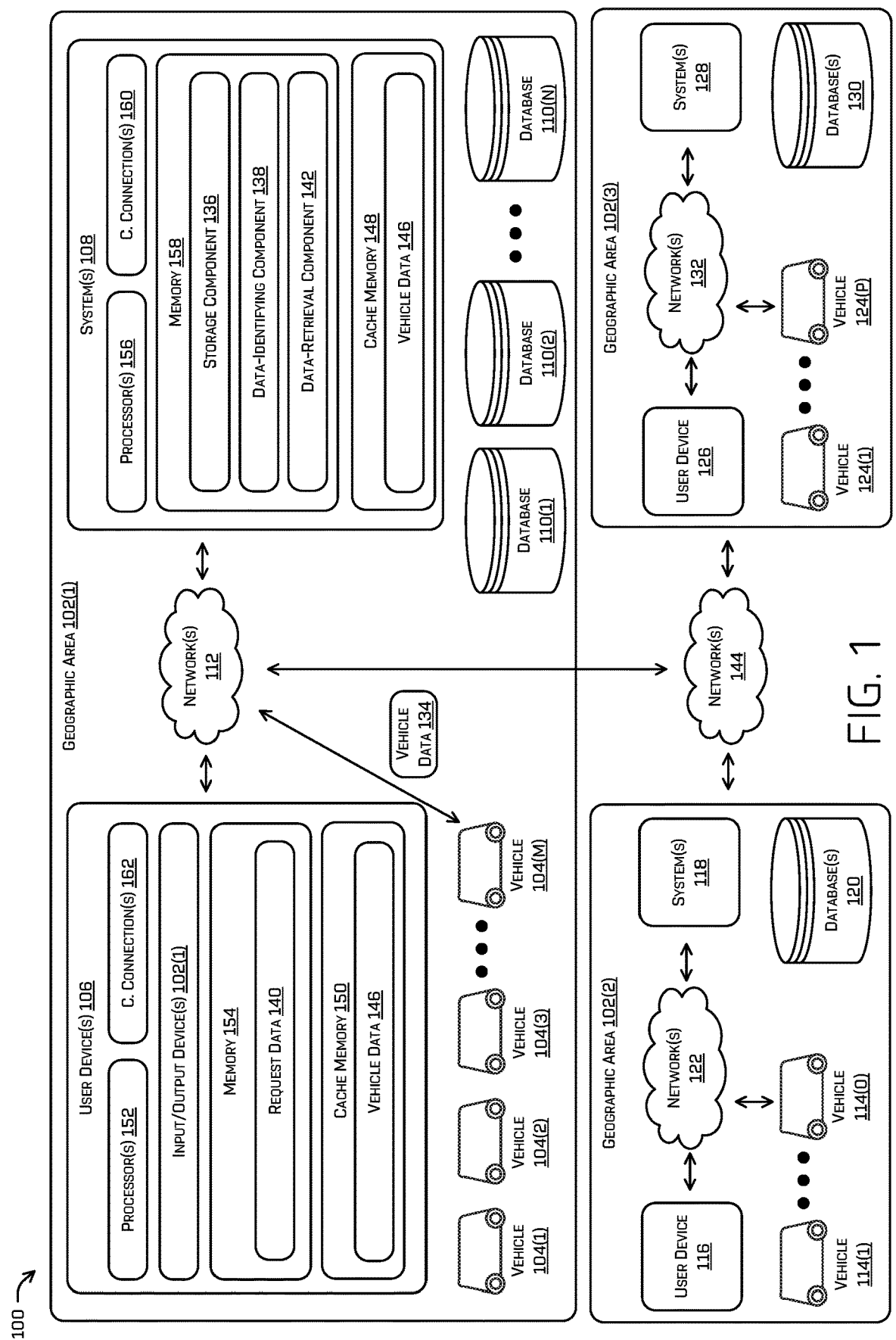
FIG. 1 illustrates an example environment for storing vehicle data at various geographic areas for which vehicles are operating.

As discussed herein, vehicles generate large amounts of data when navigating around environments. For instance, the vehicles may generate sensor data using sensors, perception and/or prediction data using systems that analyze the sensor data, control data for controlling the vehicles, and/or other types of data. In some circumstances, it is important to store this data, such as to later analyze the data in order to further train the systems of the vehicles and/or determine why the vehicles performed certain maneuvers. However, based on the amount of data, it may be difficult to store the data in such a way that users are able to easily and efficiently retrieve the data.

As such, techniques for storing and accessing vehicle data are described herein. As used herein, vehicle data can include sensor data, vehicle system data, or other data pertaining to autonomous vehicles. Vehicle data need not be captured by an autonomous vehicle. Vehicles using or capturing vehicle data may operate in different geographic areas. As described herein, a geographic area may include, but is not limited to, a town, a city, a state, a region, and/or any other type of geographic area. As such, systems associated with the geographic areas may receive the vehicle data generated by the vehicles operating in the geographic areas and store the vehicle data in local memories. In some examples, the systems may be located in or near the regions with which they are associated. For example, first system(s) may store first vehicle data in first memory associated with a first geographic area for which first vehicles operate, second system(s) may store second vehicle data in second memory associated with a second geographic area for which second vehicles operate, and/or so forth. Since users in various geographic areas may require specific types of data, the systems may further be configured to retrieve that data from other systems. For instance, and in the example above, the first system(s) may request a portion of the second vehicle data from the second system(s), where the portion of the second vehicle data is associated with a type of vehicle data requested by first users located within the first geographic area. The first system(s) may then just store this portion of the second vehicle data in the first memory. This way, the first system(s) may only retrieve vehicle data, from other geographic areas, that is utilized by the first users located within the first geographic area. This improves the systems, as the systems may not have to send all of the vehicle data to a central location for storage.

For more detail, each geographic area may be associated with at least one or more systems, one or more different types of memory, one or more user devices, and one or more vehicles. For instance, and using the example above, the first vehicles may operate in the first geographic area (e.g., navigate within a boundary that represents the first geographic area). While operating, the first vehicles may send, to the first system(s), vehicle data generated by the first vehicles. As described herein, vehicle data may include, but is not limited to, sensor data, log data (e.g., data representing outputs from one or more systems of the vehicles), messages, input data from users of the vehicles, control data for navigating the vehicles, and/or any other type of data generated, analyzed, received, and/or utilized by the vehicles. The first system(s) may then store the first vehicle data in the first memory associated with the first geographic area. In some examples, the first system(s) store the first vehicle data in a first type of memory, wherein the first type of memory is for long-term storage. For example, the first system(s) may store the first vehicle data in one or more databases that are associated with long-term storage.

In some examples, the first system(s) store the first vehicle data using first data packages. As described herein, a data package may be configured to store at least a portion of vehicle data generated by the vehicles within a geographic area. In some examples, the data package stores a specific amount of vehicle data, such as, but not limited to, one megabyte, five megabytes, ten megabytes, fifty megabytes, and/or any other amount of data. In some examples, the data package stores vehicle data that represents a specific period of time, such as, but not limited to, one minute of vehicle data, five minutes of vehicle data, ten minutes of vehicle data, thirty minutes of vehicle data, and/or any other length of time. For example, a data package may store all of the vehicle data that is generated by a vehicle during a ten-minute period of time. In some examples, a data package may be configured to store all types of vehicle data generated by a vehicle. For example, the data package may store the sensor data, the log data, the messages, the input data, the control data, and/or the like that was generated during a period of time. In some examples, a data package may be configured to store a specific type of data, such as the lidar data that was generated during the period of time.

The data package may further include data representing information about the vehicle data that is stored within the data package. For a first example, the data package may include a preamble that represents a version of the data package, a checksum for the data package, a size of the data package, a creation data of the data package, a modification date of the data package, and/or an identifier of the vehicle that generated the vehicle data. For a second example, the data package may include entries for topics (e.g., different types of vehicle data) that are represented by the vehicle data. The entry may include a start time for the vehicle data that represents the topic, an end time for the vehicle data that represents the topic, whether the vehicle data for the topic is mutable or immutable, a checksum for the vehicle data that represents the topic, an offset for the vehicle data that represents the topic, a length of the vehicle data that represents the topic, a compression algorithm for the vehicle data that represents the topic, and/or any other information associated with the topic.

In some examples, the data package may also indicate a time-to-live (TTL) associated with at least a portion of the vehicle data stored in the data package. For instance, the portion of the vehicle data may include a specific type of vehicle data, such as sensitive data. For example, one or more cameras located within an interior of the vehicle may generate video data depicting the passengers. In this example, this video data may include sensitive data. As such, the data package may indicate a TTL for the sensitive data, such as one day, one week, one month, and/or any other period of time. This way, the portion of the vehicle data that includes the sensitive data may be deleted at the elapse of the period of time while the rest of the vehicle data remains stored in the data package. Additionally, by using the TTL, the sensitive data can be deleted from storage in each of the geographic areas that are storing the sensitive data and/or the various memory subsystems that may (purposefully or inadvertently) store copies of the sensitive data. The use of a TTL or similar field may be used such that all such copies of the sensitive data are removed from all storage systems that may contain them.

In some examples, the first system(s) (and/or other system(s)) may store the sensitive data for longer than the ordinary TTL. For example, if an incident occurred that is represented by the sensitive data, such as nefarious behavior within one of the first vehicles, then the first system(s) may want to store the sensitive data for a longer period of time than the TTL. In such an example, the first system(s) may modify the TTL in order to include the longer period of time than the ordinary TTL or set a flag to override the TTL's functionality. This way, the sensitive data is still associated with a TTL, such that the sensitive data will be deleted at all geographic areas at the elapse of the TTL. Additionally, the sensitive data will be stored long enough for user(s) to use the sensitive data as needed based on the incident. In some example, only one copy of such data may be modified to be retained (for example, a copy in a database corresponding to a geographic region from which it was gathered) whereas other copies may be deleted.

In some examples, the data packages and/or at least a portion of the data within the data packages (e.g., data associated with various topic(s) included in the data package) may be secured, such as by using encryption or deleted (e.g., through use of the aforementioned TTL flag). The portions may be flagged by topic (e.g., information gathered from certain sensors or for use by a certain system). In this manner, multi-purpose data packages that may be formatted to optimize data retrieval can include both sensitive and non-sensitive data and each can be secured accordingly. For example, if a data package includes sensitive data, then the sensitive data may be encrypted. As will be described in more detail below, the data may then be securely sent between systems located within different geographic areas. Additionally, the systems may store the keys for decrypting the encrypted data. For example, if the first system(s) receive a data package from the second system(s), where the data within the data package is encrypted, then the first system(s) may use a stored key in order to decrypt the encrypted data.

As described above, the first system(s) may also be configured to request specific types of vehicle data from other system(s) associated with other geographic areas. For example, the first system(s) may request vehicle data that the first users located within the first geographic use for data analysis (e.g., determining why vehicles performed specific functions), data processing (e.g., training the systems of the vehicles), vehicle simulations, generating maps, and/or the like. The first system(s) may use one or more techniques in order to determine the specific types of vehicle data. For instance, and in some examples, the first system(s) may analyze data (referred to, in some examples, as "request data") representing requests that have been made by the first users, where the requests indicate the types of vehicle data being requested by the first users. In some examples, the first system(s) analyze the request data using one or more machine-learning components to determine the types or portions of vehicle data.

As an example, if a portion of the first users work on the lidar systems of the vehicles, such as to improve the lidar systems, then the requests from these first users may include requests for lidar data generated by the vehicles. As such, a machine-learning or other component may analyze the request data associated with these first users in order to determine that these first users request lidar data (e.g., a specific type of vehicle data). As an example, if a portion of the first users are associated with a perception team that works to improve the perception components of the vehicles, then the requests from these first users may include requests for data that is input into and/or output by the perception components of the vehicles. As such, a machine-learning component may analyze the request data associated with these first users in order to determine that these first users request the data that is input into and/or output by the perception components (e.g., a specific type of vehicle data). As an example, if a portion of the first users analyze vehicle data in order to determine why near-accidents occurred, then the requests from these first users may include requests for vehicle data generated during near-accident events. As such, a heuristics component may analyze the request data associated with these first users in order to determine that these first users request the vehicle data generated during near-accident events (e.g., a specific type of vehicle data). In general, a machine-learned, deterministic, and/or heuristics-based approach may be used to intelligently move (or copy) data from a region in which it was gathered to another region for local consumption. The decision to move the data can be based on prior data requests (e.g., trends in data requests of certain types or data associated with a certain type of vehicle maneuver or environment), a job function of a group within the external region (e.g., perception, legal, interior interfaces, etc.), and/or a type of data encoded the region in which it was gathered (e.g., all data gathered from a specific sensor model or type). In this manner, appropriate vehicle log or other data can be pre-cached at a local memory location for local consumption in an efficient manner. In some examples vehicle log or other data may have associated metadata to characterize or classify the type of data contained therein to support tracking and pre-caching.

In some examples, the first system(s) (e.g., machine-learning component(s)) may be trained to identify a specific type of vehicle data using one or more thresholds and/or heuristics or deterministic components can be used to similar effect. As an example, the first system(s) (e.g., the machine-learning component(s)) may be trained to identify a specific type of vehicle data based on a threshold number of users previously requesting the specific type of vehicle data. The threshold number of users may include, but is not limited to, one user, five users, ten users, one hundred users, and/or the like. For an example, the first system(s) (e.g., the machine-learning component(s)) may be trained to identify a specific type of vehicle data based on a threshold amount of the vehicle data previously being requested. The threshold amount of vehicle data may include, but is not limited to, one megabyte, one gigabyte, and/or the like. For another example, the first system(s) (e.g., the machine-learning component(s)) may be trained identify a specific type of vehicle data based on the vehicle data being previously requested by the users at a threshold frequency. The threshold frequency may include, but is not limited to, every hour, every day, every week, every month, and/or the like.

After identifying a specific type of vehicle data, the first system(s) may then retrieve vehicle data associated with the specific type of vehicle data from other system(s) associated with other geographic area(s). In some examples, the first system(s) initially determine which system(s) store the vehicle data that is associated with the specific type of vehicle data. For example, the first system(s) may store data that identifies at least the other system(s), the geographic area(s) associated with the other system(s), the type(s) of vehicle data stored by the other system(s), and/or the like. As such, the first system(s) may use this data to determine that at least the second system(s) associated with the second geographic area store the identified specific type of vehicle data. The first system(s) may then send a request to the second system(s) for the vehicle data. The request may, include, but is not limited to, an indication of the specific type of vehicle data, an identifier of a vehicle that generated the vehicle data, a time period that for which vehicle generated the vehicle data, and/or the like.

However, in other examples, the first system(s) may not initially determine which system(s) store the specific type of vehicle data. Rather, the system(s) may send requests to one or more of the other system(s), where these requests indicates at least the specific type of vehicle data. The other system(s) may then use the requests to determine whether the vehicle data that is being stored by these other system(s) is associated with the specific type of vehicle data.

Based on sending a request, the first system(s) may then receive the vehicle data that is associated with the type of vehicle data. For instance, and using the example above, if the first system(s) send the request for the specific type of vehicle data to the second system(s), then the first system(s) may begin to receive the portion of the second vehicle data that is associated with the type of vehicle data from the second system(s). Additionally, the first system(s) may then store the portion of the second vehicle data in the first memory. In some examples, the first system(s) store the portion of the second vehicle data in a second type of memory that is different the first type of memory used to store the first sensor data. For example, the first type of memory may be used to store the first vehicle for a first period of time where the second type of memory is used to store the portion of the second vehicle data for a second period of time, where the second period of time is less than the first period of time.

For example, the second type of memory may include a cache memory that the first system(s) use to store requested vehicle data from other system(s). By storing the requested vehicle data in cache memory, the first system(s) are able to quickly provide the requested vehicle data to the first users, such as upon request. For example, after storing the requested vehicle data in the cache memory, the first system(s) may receive, from a user device associated with a first user, a request for the vehicle data. Since the vehicle data being requested is stored within the cache memory, the first system(s) are able to quickly retrieve and then send the vehicle data to the user device.

In some examples, the first system(s) receive the requested vehicle data using data packages that are similar to the data packages described above. For instance, based on receiving a request for a specific type of vehicle data, the second system(s) may retrieve the requested vehicle data from one or more data packages stored in the second memory. The second system(s) may then store requested vehicle data in one or more new data packages, where these new data packages include similar information as the data packages described above. For example, if the request is for lidar data generated by vehicles during a period of time, the second system(s) may search through the second memory in order to identify data packages that store lidar data generated by the vehicles during the period of time. The second system(s) may then retrieve this lidar data from the data packages and repackage this lidar data into one or more new data packages for sending to the first system(s). When generating the new data package(s), the second system(s) may add data representing at least a portion of the information above.

While these examples describe the requested vehicle data as being stored in data packages similar to the first vehicle data described above, in other examples, the requested vehicle data may be stored using one or more additional and/or alternative techniques. For example, the requested vehicle data may be stored in files on the second memory, where the files are less than a threshold size. The threshold size may include, but is not limited to, 1 kilobyte, 10 kilobytes, 50 kilobytes, and/or any other size. Additional data representing information about the files may also be stored. The information for a file may include, but is not limited to, the type of vehicle data store in the file, a time that the vehicle data stored in the file was generated, an identifier of a vehicle that generated the vehicle data, and/or any other information. The second system(s) may then use this information to identify the files that include the vehicle data that is associated with the request.

For example, the second system(s) may use the information to identify the files that store the type of vehicle data being requested. Since the second system(s) may identify a large number of files associated with the request, the second system(s) may then package the vehicle data from the files into one or more data packages, which are similar to the other data packages described herein. This way, the second system(s) are able to send the first system(s) larger data package(s) rather than the large number of files, which may save computing resources. Additionally, the first system(s) are able to store the larger data package(s) in the first memory rather than store the large number of files, which may also help save computing resources.

While the examples above describe storing vehicle data associated with vehicles, similar processes may be performed for other types of data. For example, sensors may be located within the geographic areas, where the sensors generate data representing the environment, the vehicles located within the environment, and/or the like. The system(s) located within these geographic areas may then receive this data generated by the sensors and store the data using the processes described herein. Additionally, other system(s) associated with other geographic areas may be able to request this data and store this data using one or more of the processes described herein.

Additionally, while the examples above describe storing the vehicle data in association with geographic areas for which the vehicles are operating, in other examples, the vehicle data may be stored using one or more additional and/or alternative techniques. For a first example, the systems may store the vehicle data according to the types of vehicle data. For instance, lidar data may be stored by first system(s) in first memories, perception data may be stored by second system(s) in second memories, prediction data may be stored by third system(s) in third memories, and/or so forth. For a second example, the systems may store the vehicle data according to groups located proximate to the systems. For instance, perception data may be stored by first system(s) in first memories that are located proximate to a perception group, prediction data may be stored by second system(s) in second memories that are located proximate to a prediction group, sensor data may be stored by third system(s) in third memories that are located proximate to a group that uses the sensor data for simulations, and/or so forth.

By performing the processes describe herein, the systems may reduce the amount of vehicle data that is communicated via networks. For example, rather than sending all of the vehicle data for all of the vehicles to a single location for storage, the vehicle data generated by vehicles that operate in a geographic area is stored locally within that geographic data. Additionally, only the vehicle data that is important to users located within that geographic area, such as the vehicle data that is analyzes and/or processed by the users, is then retrieved from the memories located within the other geographic areas. This may save computing resources, such as processing resources, network resources, storage resources, and/or the like. Furthermore, by storing the requested vehicle data in a second type of memory, where the users located within the geographic area are likely to request this vehicle data, the system(s) are able to quickly and efficiently provide this vehicle data to the users.

The techniques described herein may be implemented in a number of ways. Example implementations are provided below with reference to the following figures. Although discussed in the context of an autonomous vehicle, the methods, apparatuses, and systems described herein may be applied to a variety of systems and is not limited to autonomous vehicles. In another example, the techniques may be utilized in an aviation or nautical context, or in any system using sensor data. Additionally, the techniques described herein may be used with real data (e.g., captured using sensor(s)), simulated data (e.g., generated by a simulator), or any combination of the two.

FIG. 1 illustrates an example environment 100 for storing vehicle data at various geographic areas for which vehicles are operating. As shown, the environment 100 includes at least a first geographic area 102(1), a second geographic area 102(2), and a third geographic area 102(3) (where the geographic areas 102(1)-(3) may be referred to generally as a "geographic area 102" or "geographic areas 102"). As described herein, a geographic area 102 may include, but is not limited to, a town, a city, a state, a region, and/or any other type of geographic area. While the example of FIG. 1 illustrates three different geographic areas 102, in other examples, the environment 100 may include any number of geographic areas 102.

The first geographic area 102(1) includes at least vehicles 104(1)-(M) (also referred to generally as a "vehicle 104" or "vehicles 104"), user device(s) 106, systems 108, and databases 110(1)-(N) (also referred to generally as a "database 110" or "databases 110"). The vehicles 104, the user device(s) 106, and the system(s) 108 may communicate using local network(s) 112 associated with the first geographic area 102(1). As further shown, the second geographic area 102(2) similarly includes at least vehicles 114(1)-(O) (also referred to generally as a "vehicle 114" or "vehicles 114"), user device(s) 116, systems 118, database(s) 120, and local network(s) 122. Additionally, the third geographic area 102(3) similarly includes at least vehicles 124(1)-(P) (also referred to generally as a "vehicle 124" or "vehicles 124"), user device(s) 126, systems 128, database(s) 130, and local network(s) 132.

In the example of FIG. 1, the vehicles 104 may be configured to operate within the first geographic area 102(1). For example, if the first geographic area 102(1) represents a region, then the vehicles 104 may be configured to navigate within the region. While operating, the vehicles 104 may generate vehicle data 134 which includes, but is not limited to, sensor data, log data (e.g., data representing outputs from one or more systems of the vehicles 104), messages, input data from users of the vehicles 104, control data, and/or any other type of data generated, analyzed, received, and/or utilized by the vehicles 104. The vehicles 104 may then send, using the local network(s) 112, the vehicle data 134 to the system(s) 108 associated with the first geographic area 102(1) for storage in the databases 110. For example, a storage component 136 of the system(s) 108 may be configured to store the vehicle data 134 within the databases 110. In some examples, the system(s) 108 store the first vehicle data 134 using data packages, which are described in more detail with regard to FIG. 2.

Similar processes may occur with respect to the second geographic area 102(2) and the third geographic area 102(3). For example, the vehicles 114 may be configured to operate within the second geographic area 102(2). While operating, the vehicles 114 may be configured to generate vehicle data. The vehicles 114 may then send, using the local network(s) 122, the vehicle data to the system(s) 118 for storage in the database(s) 120. Additionally, the vehicles 124 may be configured to operate within the third geographic area 102 (3). While operating, the vehicles 124 may be configured to generate vehicle data. The vehicles 124 may then send, using the local network(s) 132, the vehicle data to the system(s) 128 for storage in the database(s) 130. In other words, vehicle data generated by the vehicles 104, 114, and 124 may be stored locally within databases 110, 120, and 130, instead of being sent and stored in the same database(s) located in at least one of the geographic areas 102.

However, in some circumstances, users located within the geographic areas 102 may require vehicle data that is stored in one of the other geographic areas 102. For example, user(s) associated with the user device(s) 106 may want to use at least a portion of the vehicle data generated by the vehicles 114 for data analysis, data processing, simulations, generating maps, and/or the like. As such, the system(s) 108 may be configured to identify the types of vehicle data that the user(s) located within the first geographic area 102(1) request and then retrieve that vehicle data for the user(s).

For example, the system(s) 108 may store a data-identifying component 138 that is configured to identify the types of vehicle data to retrieve from the other geographic areas 102(2)-(3). In some examples, to identify the types of vehicle data, the data-identifying component 138 may analyze requests made by the users for specific types of the vehicle data, where the requests may be represented by request data 140. Based on the analysis, the data-identifying component 138 may be configured to identify the types of vehicle data to retrieve. When performing these processes, the data-identifying component 138 may be trained to identify a specific type of vehicle data using one or more thresholds. For instance, in some examples, the data-identifying component 138 may be trained to identify a specific type of vehicle data based on a threshold number of users previously requesting the specific type of vehicle data. For a first example, the data-identifying component 138 may be trained to identify a specific type of vehicle data based on ten users located within the first geographic area 102(1) previously requesting that type of vehicle data. For a second example, the data-identifying component 138 may be trained to identify a specific type of vehicle data based on 50% of the users located within the first geographic area 102(1) previously requesting that type of vehicle data In some examples, the data-identifying component 138 may be trained to identify a specific type of vehicle data based on a threshold amount of the vehicle data being requested. For example, the data-identifying component 138 may be trained to identify a specific type of vehicle data based on users located within the first geographic area 102(1) previously requesting 500 megabytes of that type of vehicle data. Still, in some examples, the data-identifying component 138 may be trained to identify a specific type of vehicle data based on the vehicle data being previously requested by the users at a threshold frequency. For example, the data-identifying component 138 may be trained to identify a specific type of vehicle data based on users located within the first geographic area 102(1) previously requesting that type of vehicle data every week.

In addition to, or alternatively from, using the requests to identify the types of vehicle data, in other examples, the data-identifying component 138 may identify the types of vehicle data based on various groups (e.g., teams) associated with the first geographicarea 102(1). For a first example, a first group that is associated the perception components of the vehicles may be located within the first geographic area 102(1). For instance, the first group may work on the perception components in order to improve the performance of the perception components. As such, the data-identifying component 138 may identify a type of vehicle data that includes the data input into and/or the data output from the perception components of the vehicles. For a second example, a second group that is associated the lidar sensors of the vehicles may be located within the first geographic area 102(1). For instance, the second group may work on the lidar sensors in order to improve the performance of the lidar sensors. As such, the data-identifying component 138 may identify a type of vehicle data that includes the sensor data output by the lidar sensors.

After identifying a type of vehicle data, a data-retrieval component 142 of the system(s) 108 may be configured to retrieve the vehicle data from the other geographic areas 102(2)-(3). In some examples, the data-retrieval component 142 retrieves the type of vehicle data based on the type of vehicle data not being stored in the databases 110. For example, if the vehicle data 134 does not include the type of vehicle data, then the data-retrieval component 142 may determine to retrieve the type of vehicle data form the other geographic areas 102(2)-(3). In some examples, the data-retrieval component 142 retrieves the type of vehicle data in addition to the vehicle data 134 stored in the databases 110. For example, even if a portion of the vehicle data 134 includes the type of vehicle data, the data-retrieval component 142 may still retrieve additional vehicle data that includes the type of vehicle data from the other geographic areas 102(2)-(3).

In some examples, to retrieve the type of vehicle data, the data-retrieval component 142 may initially identify which geographic areas 102 store the type of vehicle data. For example, the system(s) 108 may store data that identifies at least the other geographic areas 102(2)-(3), the other systems 118, 128, the type(s) of vehicle data stored by the other systems 118, 128, and/or the like. As such, the data-retrieval component 142 may use this data to determine that at least the system(s) 118 associated with the second geographic area 102(2) store the identified type of vehicle data. The data-retrieval component 142 may then send, using the network(s) 144, a request to the system(s) 118 for the type of vehicle data. For instance, the request may include, but is not limited to, an indication of the type of vehicle data, an identifier of a vehicle that generated the type of vehicle data, a time period that for which vehicle generated the type of vehicle data, and/or the like.

However, in other examples, the data-retrieval component 142 may not initially determine which systems 118, 128 store the type of vehicle data. Rather, the data-retrieval component 142 may send, using the network(s) 144, requests to each of the system 118, 128, where these requests indicates at least the type of vehicle data. The other systems 118, 128 may then use the requests to determine whether the vehicle data that is being stored by these other systems 118, 128 is associated with the type of vehicle data.

The system(s) 108 may then receive, using the network(s) 144, vehicle data 146 that is associated with the requested type of vehicle data from the system(s) 118, 128. Additionally, the storage component 136 of the system(s) 108 may be configured to store the vehicle data 146. In some examples, the storage component 136 stores the vehicle data 146 in memory that is different from the memory used to store the vehicle data 134. For instance, and as illustrated in the example of FIG. 1, the storage component 136 may store the vehicle data 146 in cache memory 148 of the system(s) 108. By storing the vehicle data 146 in the cache memory 148, the system(s) 108 are able to quickly retrieve and provide the vehicle data 146 to user(s), such as in response to receiving a request for the vehicle data 146.

The system(s) 108 may further send the vehicle data 146 to the user device(s) 106. In some examples, the system(s) 108 send the vehicle data 146 based on receiving, from the user device(s) 106, a request for the vehicle data 146. In other examples, the system(s) 108 send the vehicle data 146 without receiving the request from the user device(s) 106. In such examples, the system(s) 108 may send the vehicle data 146 so that the user device(s) 106 are able to store the vehicle data 146 in cache memory 150 for the user(s).

In the example of FIG. 1, the vehicle data 134 stored in the databases 110 may be stored for a first amount of time while the vehicle data 146 stored in the cache memory 148 (and/or the cache memory 150) may be stored for a second period of time, wherein the first period of time is greater than the second period of time. For instance, the system(s) 108 may be configured to store the vehicle data 134 stored in the databases 110 for a year, five years, ten years, fifty years, and/or longer. However, the system(s) 108 may be configured remove the vehicle data 146 from the cache memory 148 (and/or the cache memory 150) when one or more events occur. For a first example, the system(s) 108 may be configured remove the vehicle data 146 from the cache memory 148 (and/or the cache memory 150) at the elapse of the second period of time, where the second period of time is one day, one week, one month, and/or the like.

For a second example, the system(s) 108 may be configured remove the vehicle data 146 from the cache memory 148 (and/or the cache memory 150) based on the cache memory 148 (and/or the cache memory 150) being full when the system(s) 108 retrieve additional vehicle data 146 for storage. In some example, the system(s) 108 may remove the oldest vehicle data 146 from the cache memory 148 (and/or the cache memory 150) to make room for storing the new vehicle data 146. In some examples, the system(s) 108 may remove specific types of the vehicle data 146 from the cache memory 148 (and/or the cache memory 150) to make room for storing the new vehicle data 146. The specific types of the vehicle data 146 may include, but are not limited to, vehicle data 146 that has not been requested by a user, vehicle data 146 that is marked to be deleted when the cache memory 148 (and/or the cache memory 150) is full, vehicle data 146 selected by one or more users for removal, and/or the like.

As described above, the user(s) may use the user device(s) 106 to request vehicle data, such as the vehicle data 134, the vehicle data 146, and/or other vehicle data stored at the other geographic areas 102(2)-(3). In some examples, to request vehicle data, a user uses the user device 106 to generate a request. The request may include, but is not limited to, an indication of the specific type of vehicle data, an identifier of a vehicle that generated the vehicle data, a time period that for which vehicle generated the vehicle data, and/or the like. In some examples, the specific type of vehicle data may be associated with a topic. For a first example, the specific type of vehicle data may indicate a topic, such as a type of sensor data (e.g., video data, lidar data, radar data, etc.) generated by a sensor. For a second example, the specific type of vehicle data may indicate a topic, such as an event that occurred (e.g., vehicle data associated with an accident, vehicle data associated with vehicles navigating through crosswalks, etc.). Still, for a third example, the specific type of vehicle data may indicate a topic, such as a system of the vehicles (e.g., data input into a perception component, data output by a prediction component, etc.).

In some examples, the request may indicate multiple types of vehicle data, multiple identifiers for more than one vehicle, multiple time periods, and/or the like. For example, the request may include multiple identifiers, such as multiple Uniform Resource Identifiers (URIs), that each identify vehicle data being requested by the user. Additionally, in such examples, the response may include all of the data requested by the user. For example, if the request is for first lidar data generated by a first vehicle during a period of time and second lidar data generated by a second vehicle during the same period of time, then the response may include a data package that includes both the first lidar data and the second lidar data.

As further illustrated in the example of FIG. 1, the user device(s) 106 may include processor(s) 152 and memory 154 and the system(s) 108 may include processor(s) 156 and memory 158. As described herein, processor(s) may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory is examples of non-transitory computer-readable media. The memory may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

As further illustrated, the system(s) 108 include one or more communication connections 160 and the user device(s) 106 include one or more communication connections 162. As described herein, communication connection(s) enable communication between the devices. For instance, the communication connection(s) 160 may enable the system(s) 108 to communicate with the user device(s) 106, the vehicles 104, the system(s) 118, and/or the system(s) 128. The communication connection(s) 162 may also enable the user device(s) 106 to communicate with the system(s) 108.

The communications connection(s) may include physical and/or logical interfaces for connecting to another computing device or a network, such as network(s) 112 and/or network(s) 144. For example, the communications connection(s) may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

Figure 2:
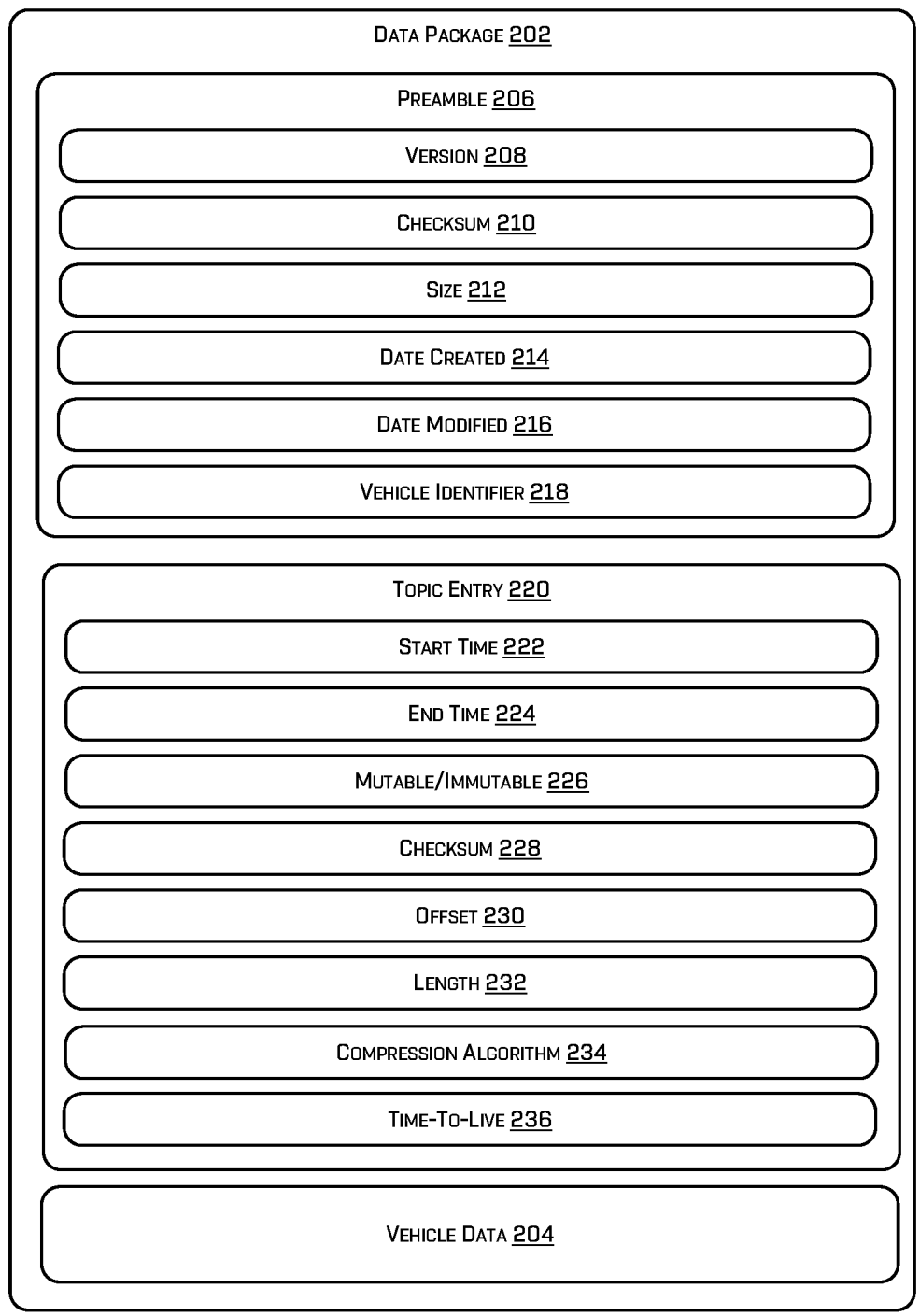
FIG. 2 illustrates an example of a data package for storing vehicle data generated by vehicles.

As described above, in some examples, the system(s) 108, 118, 128 may store the vehicle data in data packages. As such, FIG. 2 illustrates an example of a data package 202 for storing vehicle data 204 generated by vehicles. In some examples, the vehicle data 204 may include a single type of vehicle data, such as lidar data, radar data, data output by a perception component, data output by a prediction component, control data, input data, and/or the like. In some examples, the vehicle data 204 may include more than one type of vehicle data. For example, the vehicle data 204 may include all of the data generated, analyzed, received, and/or utilized by a vehicle, such as during a period of time.

As shown, the data package 202 may include a preamble 206 that includes information about the vehicle data 204 stored in the data package 202. In the example of FIG. 2, the preamble 206 may include at least a version 208 of the data package 202, a checksum 210 associated with the data package 202, a size 212 of the data package 202, a date 214 that the data package 202 was created, a date 216 that the data package 202 was modified, and an identifier 218 associated with the vehicle that generated by the vehicle data 204.

The version 208 may include a number, letter, and/or other type of identifier that indicates the version of the data package 202, where the version 208 is updated whenever changes occur with the data package 202. For example, the version 208 may be updated each time there is data added to the data package 202, data removed from the data package 202, and/or data within the data package 202 is modified. The checksum 210 may be generated by the vehicle that generated the vehicle data 204 and/or the system(s) that generated the data package 202. The checksum 210 may be used in order to verify the integrity of the data package 202, such as after the data package 202 is sent over network(s) between two devices.

The size 212 may indicate the size of the data package 202. For example, the size 212 may indicate the number of kilobytes, megabytes, gigabytes, and/or the like of the data package 202. The date 214 may indicate the date that the data package was created. As described herein, a date may include, but is not limited to, a year, a month, a day, a hour, a minute, a second, and/or the like. The date 216 may indicate the date that the data package 202 was modified if the data package 202 has been modified. As described above, the data package 202 may be modified based on data being added to the data package 202, data being removed from the data package 202, and/or data within the data package 202 being modified. The vehicle identifier 218 may include, but is not limited to, a name, a code, a word, an alphabetic identifier, a numerical identifier, an alphanumeric identifier, and/or any other identifier that may be used to identify a vehicle.

As further illustrated in the example of FIG. 2, the data package 202 may include data representing a topic entry 220 associated with at least a portion of the vehicle data 204. For instance, and as described herein, the vehicle data 204 may represent different topics. In some examples, a topic may include, but is not limited to, different types of sensor data (e.g., lidar data, image data, video data, radar data, etc.), data that is input into and/or output out of systems (e.g., data input into a perception component, data input into a prediction component, data output by the perception component, data output by the prediction component, etc.), data that represents specific events, and/or the like. As described herein, an event may include, but is not limited to, a vehicle being involved in a collision, a vehicle being involved in a near collision, a vehicle navigating over a type of road (e.g., a crosswalk, a construction zone etc.), a vehicle performing a specific maneuver (e.g., starting, turning, stopping, etc.), and/or any other event that a vehicle may experience.

In some examples, the data package 202 may be associated with a single topic and, as such, the data package 202 may include only a single topic entry 220. For example, if the vehicle data 204 stored in the data package 202 only includes lidar data generated by a vehicle during a specific period of time, then the data package 202 may only include one topic entry 220 for the lidar data. In some examples, the data package 202 may be associated with multiple topics and, as such, the data package 202 may include more than one topic entry 220. For example, if the vehicle data 204 includes sensor data generated by a vehicle during two different periods of time, then the data package 202 may include a first topic entry 220 for first sensor data generated during a first period of time and a second topic entry 220 for second sensor data generated during a second period of time.

The topic entry 220 may include information describing and pointing to the actual topic data in the vehicle data 204. For example, the topic entry 220 may be similar to a Table of Contents that describes to and points to the actual topic data in the vehicle data 204. As shown, the information may include at least a start time 222, an end time 224, an indication 226 of whether the vehicle data 204 is mutable or immutable, a checksum 228, an offset 230, a length 232, a compression algorithm 234, and/or a TTL. The start time 222 may indicate the start of the period of time that is associated with the vehicle data 204. Additionally, the end time 224 may indicate the end of the period of time that is associated with the vehicle data 204. For example, if the topic entry 220 is associated with sensor data that was generated during a ten minute period of time, then the start time 222 may include May 4, 2022 at 3:20:00 and the end time 224 may include May 4, 2022 at 3:30:00.

The indication 226 may indicate whether the vehicle data 204 associated with the topic is mutable or immutable. As described herein, data is mutable when the data may be changed (e.g., modified, removed, replaced, etc.), such as by one or more users. For example, if the vehicle data 204 includes data output from a perception component of the vehicle, then the topic entry 220 may indicate that the data is mutable such that the one or more users are able change the data for performing various simulations. Additionally, data is immutable when the data cannot and/or should not be changed and/or deleted, such as by the one or more users. For example, if the vehicle data 204 includes sensor data generated by one or more sensors of the vehicle, then the topic entry 220 may indicate that the data is immutable since the system(s) do not want the sensor data to be changed and/or deleted.

The offset 230 may indicate where the vehicle data 204 associated with the topic exists with regard to the other vehicle data 204. For instance, the offset 230 may refer to the number of bytes from the start of the data package 202 that the topic data starts. Additionally, the length 232 may indicate the number of bytes that are associated with the topic data. As such, the offset 230 and the length 232 allow for the system(s) to seek and extract the topic data from the data package 202.

The checksum 228 may be generated by the vehicle that generated the vehicle data 204 associated with the topic and/or the system(s) that generated the data package 202. The checksum 228 may be used in order to verify the integrity of the vehicle data 204, such as after the data package 202 is sent over network(s) between two devices. The compression algorithm 234 may indicate the algorithm that was used to compress the vehicle data 204 associated with the topic. In some examples, the vehicle compresses the vehicle data 204 while, in some examples, the system(s) that generate the data package 202 compress the vehicle data 204.

The TTL 236 may represent the time-to-live for the vehicle data 204 that is associated with the topic. For example, and as discussed above, the vehicle data 204 associated with the topic may include a specific type of data, such as sensitive data. As such, the TTL 236 may indicate the time that this vehicle data 204 is to be deleted.

Figure 3:
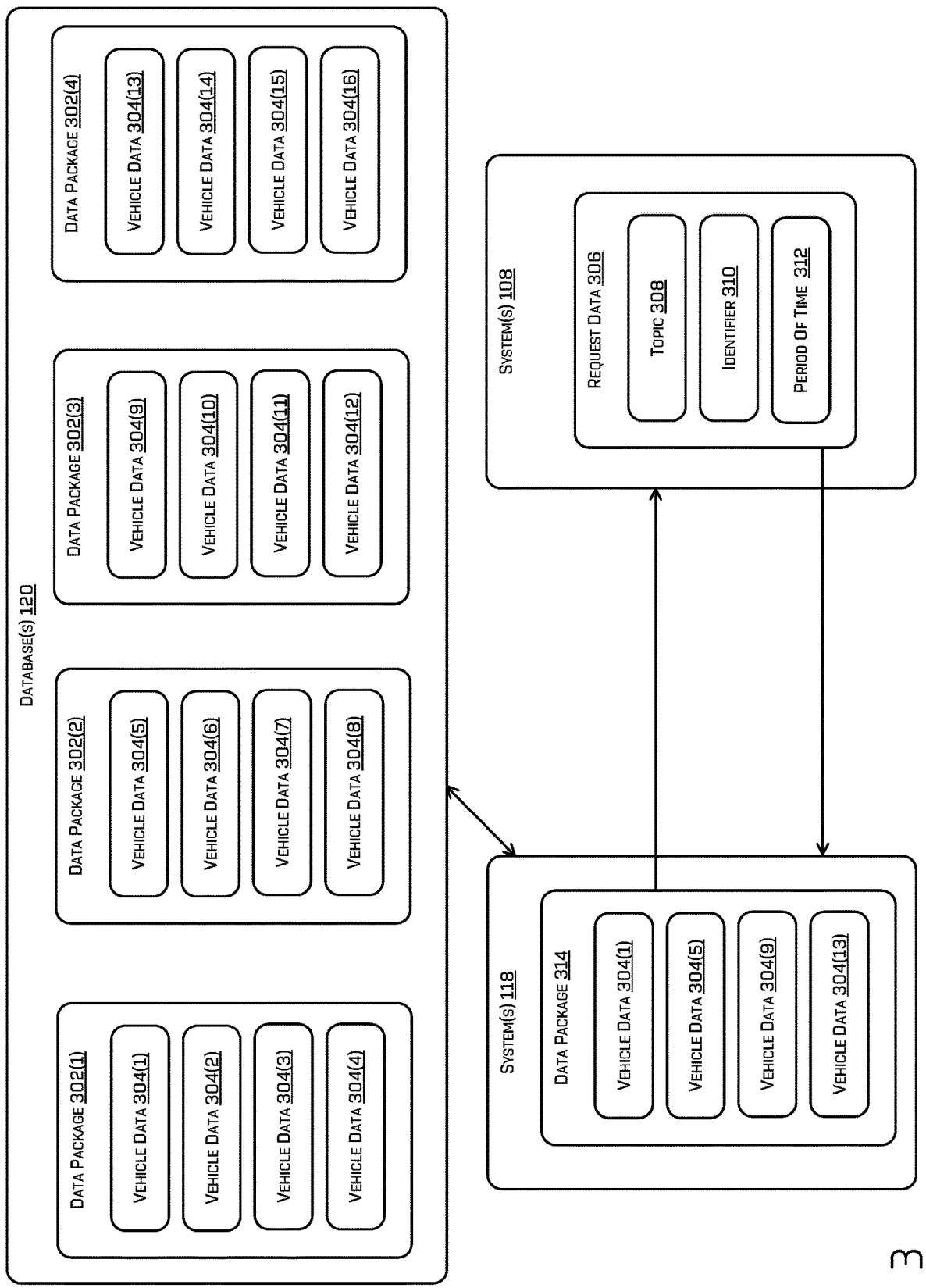
FIG. 3 illustrates an example of retrieving vehicle data in response to a request.

FIG. 3 illustrates an example of retrieving vehicle data in response to a request. As shown, the system(s) 118 may use data packages 302(1)-(4) (also referred to generally as a "data package 302" or "data packages 302") to store vehicle data 304(1)-(16) (also referred to generally as "vehicle data 304") in the database(s) 120. For example, the data package 302(1) may store the vehicle data 304(1)-(4) generated by a vehicle during a first period of time, the data package 302(2) may store the vehicle data 304(5)-(8) generated by the vehicle during a second period of time, the data package 302(3) may store the vehicle data 304(9)-(12) generated by the vehicle during a third period of time, and the data package 302(4) may store the vehicle data 304 (13)-(16) generated by the vehicle during a fourth period of time.

The system(s) 118 may then receive a request, which is represented by request data 306, where the request indicates at least a topic 308, an identifier 310 of the vehicle, and a period of time 312. For example, the topic 308 may indicate a type of vehicle data, such as lidar data. As such, the system(s) 118 may retrieve the type of vehicle data that was generated by the vehicle and during the period of time 312. The system(s) 118 may then generate a new data package 314 that includes the retrieved vehicle data.

For instance, and in the example of FIG. 3, the system(s) 118 may use the preambles associated with the data packages 302 to determine that the vehicle data 304 was generated by the vehicle associated with the identifier 310. The system(s) 118 may also use the topic entries associated with the data packages 302 to determine that the vehicle data 304 was generated during the period of time 312. Additionally, the system(s) 118 may determine that the vehicle data 304(1) from the data package 302(1), the vehicle data 304(5) from the data package 302(2), the vehicle data 304(9) from the data package 302(3), and the vehicle data 304 (13) from the data package 302(4) are associated with the topic 308 (e.g., include lidar data). As such, the system(s) 118 may retrieve the vehicle data 304(1), the vehicle data 304(5), the vehicle data 304(9), and the vehicle data 304 (13) and store the vehicle data 304(1), the vehicle data 304(5), the vehicle data 304(9), and the vehicle data 304 (13) within the data package 314.

Figure 4:
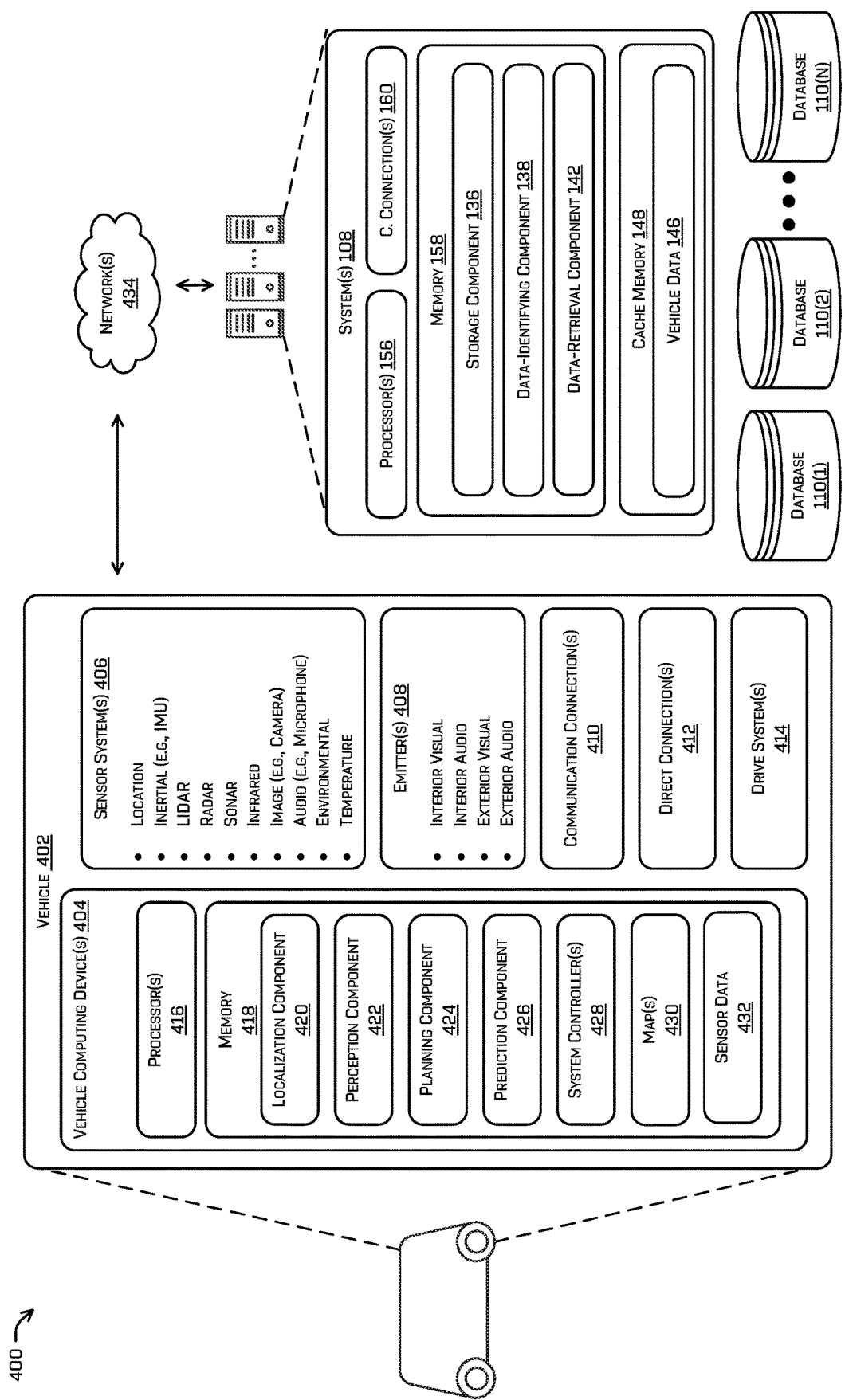
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402. The vehicle 402 may represent, and/or include, the one of the vehicles 104. The vehicle 402 may include one or more vehicle computing devices 404, one or more sensor systems 406, one or more emitters 408, one or more communication connections 410, at least one direct connection 412, and one or more drive systems 414.

The vehicle computing device(s) 404 may include one or more processors 416 and memory 418 communicatively coupled with the processor(s) 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In the illustrated example, the memory 418 of the vehicle computing device(s) 404 stores a localization component 420, a perception component 422, a planning component 424, a prediction component 426, one or more system controllers 428, and one or more maps 430. Though depicted in FIG. 4 as residing in the memory 418 for illustrative purposes, it is contemplated that the localization component 420, the perception component 422, the prediction component 426, the planning component 424, system controller(s) 428, and/or the map(s) 430 may additionally, or alternatively, be accessible to the vehicle 402 (e.g., stored on, or otherwise accessible by, memory remote from the vehicle 402, such as, for example, on memory 158 of the system(s) 108).

In at least one example, the localization component 420 may include functionality to receive sensor data 432 from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430, and may continuously determine a location and/or orientation of the vehicle 402 within the environment. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 402. In some instances, the localization component 420 may provide data to various components of the vehicle 402 to determine an initial position of the vehicle 402 for determining the relevance of an object to the vehicle 402, as discussed herein.

In some instances, the perception component 422 may include functionality to perform object detection, segmentation, and/or classification. In some examples, the perception component 422 may provide processed sensor data 432 that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data 432 that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data 432 that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 426 may generate one or more probability maps representing prediction probabilities of possible locations of one or more objects in an environment. For example, the prediction component 426 may generate one or more probability maps for vehicles, pedestrians, animals, and the like within a threshold distance from the vehicle 402. In some instances, the prediction component 426 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 426 may generate predicted trajectories of objects (e.g., objects) in an environment. For example, the prediction component 426 may generate one or more predicted trajectories for objects within a threshold distance from the vehicle 402. In some examples, the prediction component 426 may measure a trace of an object and generate a trajectory for the object based on observed and predicted behavior.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the vehicle 402 along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle.

In other examples, the planning component 424 may alternatively, or additionally, use data from the localization component 420, the perception component 422, and/or the prediction component 426 to determine a path for the vehicle 402 to follow to traverse through an environment. For example, the planning component 424 may receive data (e.g., object data) from the localization component 420, the perception component 422, and/or the prediction component 426 regarding objects associated with an environment. In some examples, the planning component 424 receives data for relevant objects within the environment. Using this data, the planning component 424 may determine a route to travel from a first location (e.g., a current location) to a second location (e.g., a target location) to avoid objects in an environment. In at least some examples, such a planning component 424 may determine there is no such collision free path and, in turn, provide a path which brings vehicle 402 to a safe stop avoiding all collisions and/or otherwise mitigating damage.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 426, and/or the planning component 424 to determine a location of the vehicle 402, detect objects in an environment, generate routes, determine actions and/or trajectories to navigate within an environment.

In some examples, the one or more maps 430 may be stored on a remote computing device(s) (such as the system(s) 108) accessible via network(s) 434 (which may include, and/or represent, the network(s) 112). In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

In some instances, aspects of some or all of the components discussed herein (e.g., with regard to the vehicle 402, the system(s) 108, etc.) may include any models, techniques, and/or machine learned techniques. For example, in some instances, the components in the memory 418 and/or the memory 158 may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., the system(s) 108, other nearby vehicles, etc.) and/or one or more remote sensor system(s) for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device(s) 404 to another computing device or a network, such as network(s) 434. For example, the communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 426, the planning component 424, the one or more system controllers 428, and the one or more maps 430 may process sensor data 432, as described above, and may send their respective outputs, over the one or more network(s) 434, to the system(s) 108 as vehicle data. In at least one example, the localization component 420, the perception component 422, the prediction component 426, the planning component 424, the one or more system controllers 428, and the one or more maps 430 may send their respective outputs to the system(s) 108 at a particular frequency, after a lapse of a predetermined period of time, in near real-time, etc.

In some examples, the vehicle 402 may send sensor data 432 to the system(s) 108 via the network(s) 434. In some examples, the vehicle 402 may receive sensor data 432 from the system(s) 108 via the network(s) 434. The sensor data 432 may include raw sensor data and/or processed sensor data and/or representations of sensor data. In some examples, the sensor data 432 (raw or processed) may be sent and/or received as one or more log files.

The processor(s) 416 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 418 is examples of non-transitory computer-readable media. The memory 418 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the system(s) 108 and the components of the system(s) 108 may be associated with the vehicle 402. That is, the vehicle 402 may perform one or more of the functions associated with the system(s) 108, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 5:
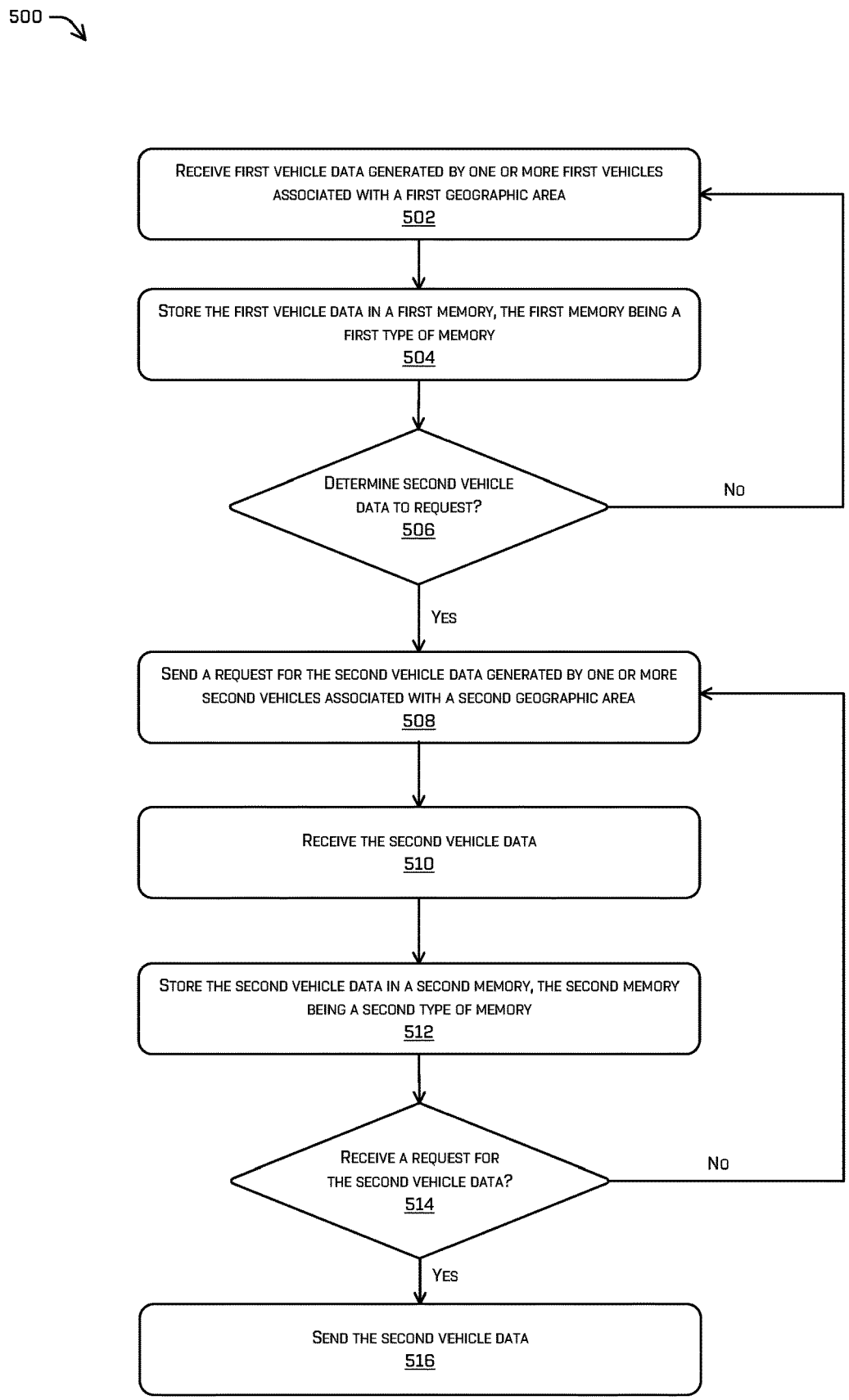
FIG. 5 is an example process for storing vehicle data on memory associated with a geographic area.
Figure 6:
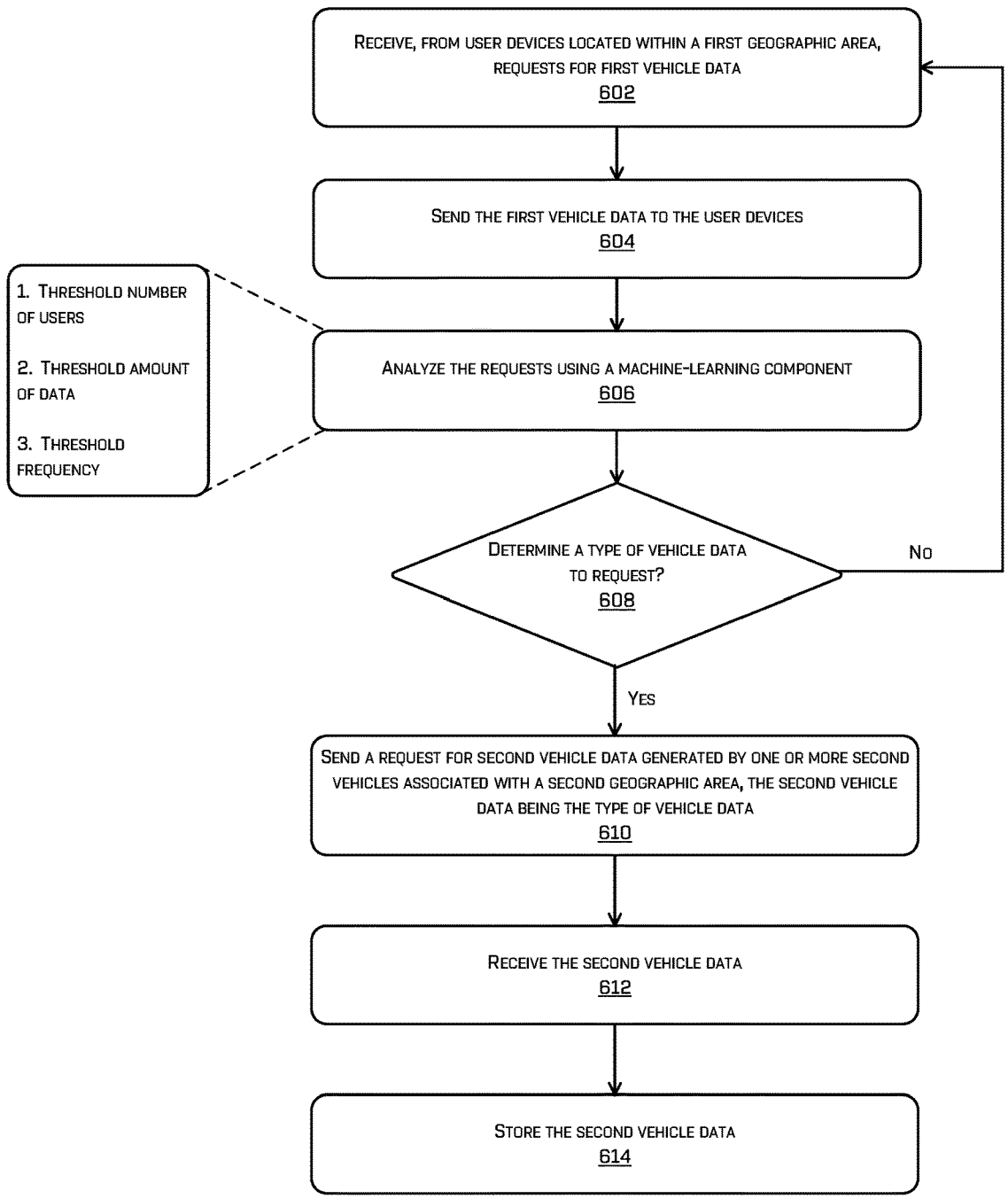
FIG. 6 is an example process for identifying and then retrieving vehicle data from another geographic area.

FIGS. 5 and 6 illustrate example processes in accordance with examples of the disclosure. The process(es) are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 5 is an example process 500 for storing vehicle data in memory associated with a geographic area. At operation 502, the process 500 may include receiving first vehicle data generated by one or more first vehicles associated with a first geographic area. For instance, the system(s) 108 may receive the first vehicle data generated by the first vehicle(s), where the first vehicle(s) operate in the first geographic area. As described herein, vehicle data may include, but is not limited to, sensor data, log data (e.g., data representing outputs from one or more systems of the vehicles), messages, input data from users of the vehicles, control data, and/or any other type of data generated, analyzed, received, and/or utilized by the vehicles.

At operation 504, the process 500 may include storing the first vehicle data in a first memory, the first memory being a first type of memory. For instance, the system(s) 108 may store the first vehicle data in the first memory, wherein the first memory is associated with the first geographic area. For instance, the first memory may include one or more databases located within the first geographic area. The first memory may also include the first type of memory. In some examples, the first type of memory may be used for long-term storage of the first vehicle data. Additionally, in some examples, the system(s) may store the first vehicle data using one or more data packages, which are described herein.

At operation 506, the process 500 may include determining whether there is second vehicle data to request. For instance, the system(s) 108 may determine whether to request second vehicle data stored by one or more other system(s) located in one or more other geographic areas. In some examples, the system(s) 108 may identify the second vehicle data to request based on user(s) located within the first geographic area requesting a type of vehicle data, such as a specific topic associated with vehicle data. For example, the user(s) located within the first geographic area may request to the type of vehicle data for data analysis (e.g., determining why vehicles performed specific functions), data processing (e.g., training the systems of the vehicles), vehicle simulations, generating maps, and/or the like.

If, at operation 506, it is determined that there is no second vehicle data to request, then the process 500 may repeat starting back at 502. However, if, at operation 506, it is determined that there is second vehicle data to request, then at operation 508, the process 500 may include sending a request for the second vehicle data generated by one or more second vehicles associated with a second geographic area. For instance, if the system(s) 108 identify the second vehicle data to request, then the system(s) 108 may send the request for the second vehicle data. In some examples, the request may indicate the type of vehicle data (e.g., a topic), a time period, an identifier of a vehicle, and/or the like. In some examples, the system(s) 108 identify and then send the request to additional system(s). In some examples, the system(s) send the request to many other system(s).

At operation 510, the process 500 may include receiving the second vehicle data and at operation 512, the process 500 may include storing the second vehicle data in a second memory, the second memory being a second type of memory. For instance, the system(s) 108 may receive the requested second vehicle data from one or more other system(s). The system(s) 108 may then store the second vehicle data in the second memory, wherein the second memory is also associated with the first geographic area. For instance, the second memory may be located within the first geographic area. The second memory may also include the second type of memory. In some examples, the second type of memory may include a cache memory.

At operation 514, it is determined whether a request for the second vehicle data has been received. For instance, the system(s) 108 may determine whether the request for the second vehicle data has been received from a user device. If, at operation 514, it is determined that the request has not been received, then the process 500 may repeat starting back at 508.

However, if at operation 514, it is determined that the request has been received, then at operation 516, the process 500 may include sending the second vehicle data. For instance, if the system(s) 108 receive the request for the second vehicle data, then the system(s) 108 may retrieve the second vehicle data from the second memory. The system(s) 108 may then send the second vehicle data to the user device.

FIG. 6 is an example process 600 for identifying and then retrieving vehicle data from another geographic area. At operation 602, the process 600 may include receiving, from user devices associated with a first geographic area, requests for first vehicle data and at operation 604, the process 600 may include sending the first vehicle data to the user devices. For instance, the system(s) 108 may receive the requests from the user devices. The requests may indicate types of vehicle data (e.g., topics), time periods associated with the first vehicle data, identifiers of vehicles that generated the first vehicle data, and/or any other information. Based on receiving the requests, the system(s) 108 may send the first vehicle data to the user devices.

At operation 606, the process 600 may include analyzing the requests using a machine-learning component and at 608, the process 600 may include determining whether there is a type of vehicle data to request. For instance, the system(s) 108 may analyze the requests using the machine-learning component in order to determine whether there is a type of vehicle data to request for storage for the users associated with the user devices. In some examples, the machine-learning component may be trained to identify a type of vehicle data based on one or more thresholds. For a first example, the machine-learning component may be trained to identify a type of vehicle data based on a threshold number of users, in the past, requesting the type of vehicle data. For a second example, the machine-learning component may be trained to identify a type of vehicle data based on a threshold amount of the vehicle data being requested in the past. Still, for a third example, the machine-learning component may be trained to identify a type of vehicle data based on the vehicle data being requested by the users, in the past, at a threshold frequency.

If, at operation 608, the type of vehicle data is not determined, then the process 600 may repeat starting back at operation 602. However, if, at operation 608, the type of vehicle data is determined, then at operation 610, the process 600 may include sending a request for second vehicle data generated by one or more second vehicles associated with the second geographic area, the second vehicle data being the type of vehicle data. For instance, if the system(s) 108 determine the type of vehicle data to request, then the system(s) 108 may send the request for the second vehicle data. In some examples, the request may indicate the type of vehicle data (e.g., a topic), a time period, an identifier of a vehicle, and/or any other information. In some examples, the system(s) 108 send the request to other system(s) associated with the second vehicle data.

At operation 612, the process 600 may include receiving the second vehicle data and at operation 614, the process 600 may include storing the second vehicle data. For instance, the system(s) 108 may receive the requested second vehicle data from the other system(s). The system(s) 108 may then store the second vehicle data in memory. In some examples, the memory may include a cache memory.

Example Clauses

A: A system comprising: one or more processors; and one or more computer-readable media storing instructions that, when executed by the one or more processors, cause the system to perform operations comprising: receiving first vehicle data generated by one or more first vehicles located within a first geographic area; storing the first vehicle data in a first memory associated with the first geographic area, the first memory being a first type of memory that is to store the first vehicle data for a first period of time; determining, based at least in part on one or more requests, to retrieve second vehicle data generated by one or more second vehicles located within a second geographic area, the second vehicle data stored in a second memory associated with the second geographic area; sending, to an additional system, a request for the second vehicle data; receiving the second vehicle data from the additional system; storing the second vehicle data in a third memory associated with the first geographic area, the third memory being a second type of memory, the second type of memory being associated with a lower latency for data retrieval than the first type of memory when requested; receiving, from a user device, a request for the second vehicle data; and sending, to the user device, the second vehicle data stored in the third memory.

B: The system of paragraph A, the operations further comprising: determining a type of vehicle data based at least in part on the one or more requests; determining that the first vehicle data stored in the first memory is not associated with the type of vehicle data; and determining that the second vehicle data stored in the second memory is associated with the type of vehicle data, wherein sending the request is based at least in part on the second vehicle data being associated with the type of vehicle data, the request indicating at least the type of vehicle data.

C: The system of either paragraph A or paragraph B, the operations further comprising: determining a type of vehicle data to request based at least in part on at least one of: a first threshold number of users having requested the type of vehicle data; a second threshold amount of the type of vehicle data having been requested; or the type of vehicle data has been requested at a third threshold frequency, wherein the request for the second vehicle data indicates the type of vehicle data.

D: The system of any one of paragraphs A-C, wherein receiving the second vehicle data comprises receiving, from the additional system, a data package that includes: the second vehicle data; an identifier of a vehicle from the one or more second vehicles, that generated the second vehicle data; a topic associated with the second vehicle data; and a time period during which the vehicle generated the second vehicle data.

E: The system of any one of paragraphs A-D, wherein the second type of memory is a cache memory.

F: A method comprising: receiving first vehicle data generated by one or more first vehicles located within a first geographic area; storing the first vehicle data in a first memory associated with the first geographic area, the first memory being a first type of memory; determining to retrieve second vehicle data generated by one or more second vehicles located within a second geographic area, the second vehicle data stored in a second memory associated with the second geographic area; sending, to a system, a request for the second vehicle data; receiving the second vehicle data from the system; and storing the second vehicle data in a third memory associated with the first geographic area, the third memory being a second type of memory that is different than the first type of memory.

G: The method of paragraph F, further comprising: after storing the second vehicle data in the third memory, receiving, from a user device, a request for the second vehicle data; based at least in part on receiving the request, retrieving the second vehicle data from the third memory; and sending the second vehicle data to the user device.

H: The method of either paragraph F or paragraph G, further comprising: determining a type of vehicle data; determining that the first vehicle data stored in the first memory is not associated with the type of vehicle data; and determining that the second vehicle data stored in the second memory is associated with the type of vehicle data, wherein sending the request is based at least in part on the second vehicle data being associated with the type of vehicle data, the request indicating at least the type of vehicle data.

I: The method of any one of paragraphs F-H, further comprising: determining a type of vehicle data to retrieve based at least in part on at least one of: a threshold number of users having requested the type of vehicle data; a threshold amount of the type of vehicle data having been requested; or the type of vehicle data having been requested at a threshold frequency, wherein the request indicates the type of vehicle data, and wherein the second vehicle data is associated with the type of vehicle data.

J: The method of any one of paragraphs F-I, further comprising: identifying at least a group of users associated with the first geographic area; and determining that the group of users requests a type of vehicle data, wherein the request indicates the type of vehicle data, and wherein the second vehicle data is associated with the type of vehicle data.

K: The method of any one of paragraphs F-J, wherein receiving the second vehicle data comprises receiving, from the system, a data package that includes: the second vehicle data; an identifier of a vehicle, from the one or more second vehicles, that generated the second vehicle data; a topic associated with the second vehicle data; and a time period that the vehicle generated the second vehicle data.

L: The method of any one of paragraphs F-K, further comprising: generating a data package that includes: the first vehicle data; an identifier of a vehicle, from the one or more first vehicles, that generated the first vehicle data; a topic associated with the first vehicle data; and a time period that the vehicle generated the first vehicle data, wherein storing the first vehicle data in the first memory comprises storing the data package in the first memory.

M: The method of any one of paragraphs F-L, wherein: the first vehicle data is stored in the first memory for a first period of time; and the second vehicle data is stored in the second memory for a second period of time that is less than the first period of time.

N: The method of any one of paragraph F-M, further comprising: receiving third vehicle data generated by the one or more first vehicles located within the first geographic area; storing the third vehicle data in the first memory along with the first vehicle data; determining to retrieve fourth vehicle data generated by the one or more second vehicles located within the second geographic area; sending, to the system, a request for the fourth vehicle data; receiving the fourth vehicle data from the system; and based at least in part on receiving the fourth vehicle data: causing the second vehicle data to be removed from the third memory; and storing the fourth vehicle data in the third memory.

O: The method of any one of paragraphs F-N, further comprising: determining that a portion of the first vehicle data is sensitive data; determining that a period of time has elapsed since storing the first vehicle data; and based at least in part on the portion of the first vehicle data being the sensitive data and the period of time elapsing, causing the portion of the first vehicle data to be removed from the first memory.

P: The method of any one of paragraphs F-O, further comprising: receiving, from the system, a request that indicates at least a type of data; determining that a portion of the first vehicle data is associated with the type of data; and based at least in part on the portion of the first vehicle data being associated with the type of data, sending the portion of the first vehicle data to the system.

Q: The method of any one of paragraphs F-P, wherein the first vehicle data comprises at least one of: sensor data generated by one or more sensors of the one or more first vehicles; log data generated by one or more systems of the one or more first vehicles; input data generated by the one or more first vehicles; command data utilized by the one or more first vehicles; or user request data.

R: One or more non-transitory computer-readable media storing instructions that, when executed by one or more processors, cause the one or more processors to perform operations comprising: receiving first vehicle data generated by one or more first vehicles located within a first geographic area; storing the first vehicle data in a first memory associated with the first geographic area, the first memory being a first type of memory; determining to retrieve second vehicle data generated by one or more second vehicles located within a second geographic area, the second vehicle data stored in a second memory associated with the second geographic area; sending, to a system, a request for the second vehicle data; receiving the second vehicle data from the system; and storing the second vehicle data in a third memory associated with the first geographic area, the third memory being a second type of memory that is different than the first type of memory.

S: The one or more non-transitory computer-readable media of paragraph R, the operations further comprising: after storing the second vehicle data in the third memory, receiving, from a user device, a request for the second vehicle data; based at least in part on receiving the request, retrieving the second vehicle data from the third memory; and sending the second vehicle data to the user device.

T: The one or more non-transitory computer-readable media of either paragraph R or paragraph S, the operations further comprising: determining a type of vehicle data; determining that the first vehicle data stored in the first memory is not associated with the type of vehicle data; and determining that the second vehicle data stored in the second memory is associated with the type of vehicle data, wherein sending the request is based at least in part on the second vehicle data being associated with the type of vehicle data, the request indicating at least the type of vehicle data.

While the example clauses described above are described with respect to one particular implementation, it should be understood that, in the context of this document, the content of the example clauses can also be implemented via a method, device, system, computer-readable medium, and/or another implementation.

Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions that, when executed by the one or more processors, cause the system to perform operations comprising:
   receiving first vehicle data generated by one or more first vehicles located within a first geographic area;
   storing the first vehicle data in a first memory associated with the first geographic area, the first memory being a first type of memory comprising a first latency for data retrieval and a first period of time for data storage;
   receiving, from a user device, a first request associated with the first geographic area;
   determining, based at least in part on the first request, a vehicle data type;
   determining, based at least in part on the vehicle data type and the first vehicle data, to retrieve second vehicle data from an additional system associated with a second geographic area, wherein the second vehicle data is generated by one or more second vehicles located within the second geographic area and stored in a second memory associated with the second geographic area, the second memory being the first type of memory;
   retrieving the second vehicle data from the additional system;
   storing the second vehicle data in a third memory associated with the first geographic area, the third memory being a second type of memory, the second type of memory comprising a second latency for data retrieval and a second period of time for data storage, wherein the second latency is a lower latency for data retrieval than the first latency;
   receiving, from the user device or another user device, a second request comprising an indication of the second vehicle data, wherein the second request is different from the first request; and
   sending, to the user device or the another user device, the second vehicle data stored in the third memory.

2. The system of claim 1, the operations further comprising:
   determining that the first vehicle data stored in the first memory is not associated with the vehicle data type; and
   determining that the second vehicle data stored in the second memory is associated with the vehicle data type,
   wherein retrieving the second vehicle data from the additional system is based at least in part on the second vehicle data being associated with the vehicle data type, the system indicating to the additional system at least the vehicle data type.

3. The system of claim 1, the operations further comprising:
   determining the vehicle data type is based at least in part on at least one of:
   a first threshold number of users having requested the vehicle data type;
   a second threshold amount of the vehicle data type having been requested; or
   the vehicle data type has been requested at a third threshold frequency, wherein retrieving the second vehicle data comprises indicating the vehicle data type.

4. The system of claim 1, wherein retrieving the second vehicle data comprises receiving, from the additional system, a data package that includes:
the second vehicle data;
an identifier of a vehicle, from the one or more second vehicles, that generated the second vehicle data;
a topic associated with the second vehicle data; and
a time period during which the vehicle generated the second vehicle data.

5. The system of claim 1, wherein the second type of memory is a cache memory.

6. A method comprising:
receiving first vehicle data generated by one or more first vehicles located within a first geographic area;
storing the first vehicle data in a first memory associated with the first geographic area, the first memory being a first type of memory comprising a first latency for data retrieval and a first period of time for data storage;
receiving a first request associated with the first geographic area;
determining, based at least in part on the first request, a type of vehicle data;
determining, based at least in part on the type of vehicle data, to retrieve second vehicle data from a system associated with a second geographic area, wherein the second vehicle data is generated by one or more second vehicles located within the second geographic area and stored in a second memory associated with the second geographic area, the second memory being the first type of memory;
receiving the second vehicle data from the system associated with the second geographic area; and
storing the second vehicle data in a third memory associated with the first geographic area, the third memory being a second type of memory that is different than the first type of memory based at least in part on the second type of memory comprising a second latency for data retrieval and a second period of time for data storage.

7. The method of claim 6, further comprising:
after storing the second vehicle data in the third memory, receiving, from a user device, a request for the second vehicle data;
based at least in part on receiving the request, retrieving the second vehicle data from the third memory; and
sending the second vehicle data to the user device.

8. The method of claim 6, further comprising:
determining that the first vehicle data stored in the first memory is not associated with the type of vehicle data; and
determining that the second vehicle data stored in the second memory is associated with the type of vehicle data,
wherein retrieving the second vehicle data is based at least in part on the second vehicle data being associated with the type of vehicle data and an indication of at least the type of vehicle data.

9. The method of claim 6, further comprising:
determining the type of vehicle data is based at least in part on at least one of:
a threshold number of users having requested the type of vehicle data;
a threshold amount of the type of vehicle data having been requested; or
the type of vehicle data having been requested at a threshold frequency,
wherein the second vehicle data is associated with the type of vehicle data.

10. The method of claim 6, further comprising:
identifying at least a group of users associated with the first geographic area; and
determining that the group of users requests the type of vehicle data,
wherein the second vehicle data is associated with the type of vehicle data.

11. The system of claim 1, wherein the vehicle data type is determined based at least in part on one or more of:
a trend associated with the first request;
a classification of the user device; or
a feature of the one or more first vehicles.

12. The method of claim 6, further comprising:
generating a first data package that includes:
the first vehicle data;
an identifier of a first vehicle, from the one or more first vehicles, that generated the first vehicle data;
a topic associated with the first vehicle data; and
a time period that the first vehicle generated the first vehicle data,
receiving, from the system, a second data package that includes:
the second vehicle data;
an identifier of a second vehicle, from the one or more second vehicles, that generated the second vehicle data;
a topic associated with the second vehicle data; and
a time period that the second vehicle generated the second vehicle data,
wherein:
storing the first vehicle data in the first memory comprises storing the first data package in the first memory; and
storing the second vehicle data in the third memory comprises storing the second data package in the third memory.

13. The system of claim 1, wherein the operations further comprise:
determining, based at least in part on the first vehicle data, first metadata associated with the first vehicle data;
determining, based at least in part on the second vehicle data, second metadata associated with the second vehicle data;
determining, based at least in part on the vehicle data type, the first metadata, and the second metadata, a likelihood of the second request comprising an indication of the vehicle data type.

14. The method of claim 6, further comprising:
receiving third vehicle data generated by the one or more first vehicles located within the first geographic area;
storing the third vehicle data in the first memory along with the first vehicle data;
determining to retrieve fourth vehicle data generated by the one or more second vehicles located within the second geographic area;
sending, to the system, a request for the fourth vehicle data;
receiving the fourth vehicle data from the system; and
based at least in part on receiving the fourth vehicle data:
causing the second vehicle data to be removed from the third memory; and
storing the fourth vehicle data in the third memory.

15. The method of claim 6, further comprising:
determining that a portion of the first vehicle data is sensitive data;

determining that a period of time has elapsed since storing the first vehicle data; and based at least in part on the portion of the first vehicle data being the sensitive data and the period of time elapsing, causing the portion of the first vehicle data to be removed from the first memory.

16. The method of claim 6, further comprising:

receiving, from the system, a request that indicates at least a type of data;

determining that a portion of the first vehicle data is associated with the type of data; and based at least in part on the portion of the first vehicle data being associated with the type of data, sending the portion of the first vehicle data to the system.

17. The method of claim 6, wherein the first vehicle data comprises at least one of:

sensor data generated by one or more sensors of the one or more first vehicles;

log data generated by one or more systems of the one or more first vehicles;

input data generated by the one or more first vehicles;

command data utilized by the one or more first vehicles; or user request data.

18. One or more non-transitory computer-readable media storing instructions that, when executed by one or more processors, cause the one or more processors to perform operations comprising:

receiving first vehicle data generated by one or more first vehicles located within a first geographic area;

storing the first vehicle data in a first memory associated with the first geographic area, the first memory being a first type of memory comprising a first latency for data retrieval and a first period of time for data storage;

receiving a first request associated with the first geographic area;

determining, based at least in part on the first request, a type of vehicle data;

determining, based at least in part on the type of vehicle data, to retrieve second vehicle data from a system associated with a second geographic area, wherein the second vehicle data is generated by one or more second vehicles located within the second geographic area and stored in a second memory associated with the second geographic area, the second memory being the first type of memory;

receiving the second vehicle data from the system associated with the second geographic area; and storing the second vehicle data in a third memory associated with the first geographic area, the third memory being a second type of memory that is different than the first type of memory based at least in part on the second type of memory comprising a second latency for data retrieval and a second period of time for data storage.

19. The one or more non-transitory computer-readable media of claim 18, the operations further comprising:

after storing the second vehicle data in the third memory, receiving, from a user device, a request for the second vehicle data;

based at least in part on receiving the request, retrieving the second vehicle data from the third memory; and sending the second vehicle data to the user device.

20. The one or more non-transitory computer-readable media of claim 18, the operations further comprising:

determining that the first vehicle data stored in the first memory is not associated with the type of vehicle data; and determining that the second vehicle data stored in the second memory is associated with the type of vehicle data, wherein retrieving the second vehicle data is based at least in part on the second vehicle data being associated with the type of vehicle data and an indication of at least the type of vehicle data.

* * * * *